March 15, 1949.  A. TAUB  2,464,755
COATED GAUZE
Filed July 9, 1946
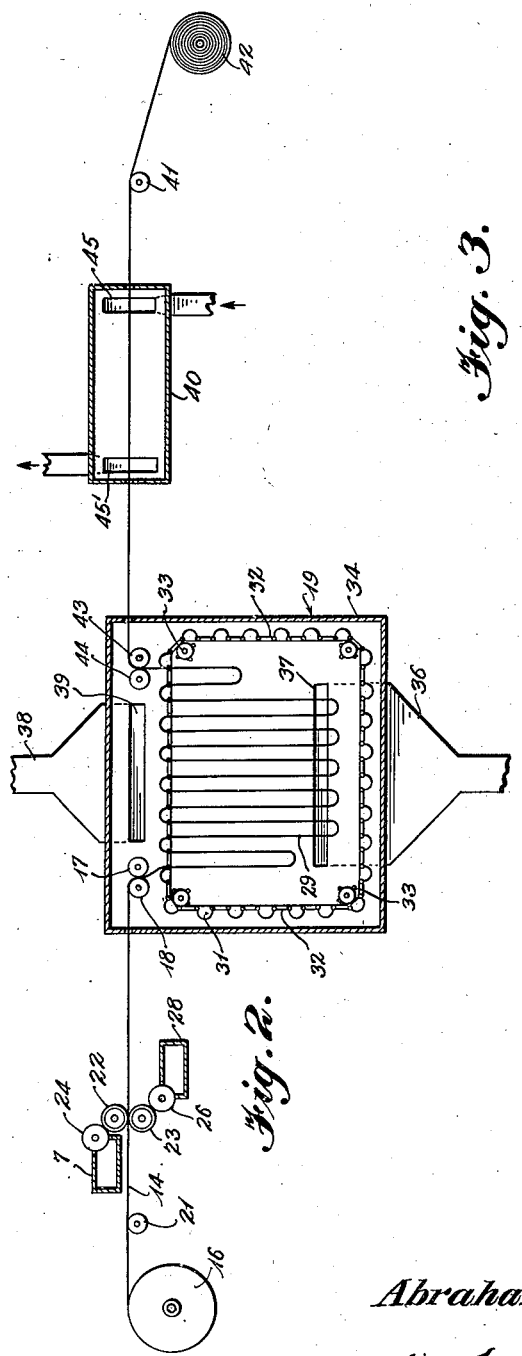
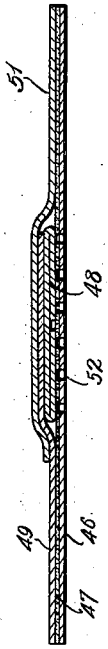
Inventor
Abraham Taub
By Harris, Kiech, Foster & Harris
Attorneys

UNITED STATES PATENT OFFICE 2,464,755

COATED GAUZE

Abraham Taub, New York, N. Y., assignor to Vodol Company, Chicago, Ill., a corporation of Illinois Application July 9, 1946, Serial No. 682,426

12 Claims. (Cl. 167—84)

This invention relates to a coated gauze especially useful as a bandage for open wounds or other open lesions and more particularly to a gauze which is coated or saturated with a flexible non-tacky water-dispersible ointment base which is compatible with the majority of medicaments employed as healing aids and which may contain one or more of such medicaments.

Known hydrophilic ointment base materials, which have heretofore been employed for coating gauze, either dry to a stiff horny material after application to the gauze or contain sufficient petrolatum or other oily or fatty material such as lanolin or glycerides that they remain tacky. In either case, the resultant bandage material is difficult to handle and apply to wounds. A stiff dry material is harsh and does not easily conform to wound surfaces while known ointment bases which contain sufficient oleaginous material to remain soft and flexible adhere to and leave deposits of the ointment on other materials with which they come in contact.

In contrast, the coated gauze of the present invention provides a dry non-tacky surface but at the same time the product remains soft and flexible. This results from the fact that drying of the ointment base material after application to the gauze causes the formation of an extremely thin non-sticky film on the exposed surfaces of the product leaving the remainder of the ointment base material in and on the gauze in the form of a soft gel. The surface film thus forms an envelope around an internal portion of soft gel positioned on the surface of and in the interstices of the gauze. The surface film prevents further evaporation of volatile material from the ointment base material. The coated gauze therefore remains soft and flexible indefinitely during storage and shipment and can be associated with other bandage material such as uncoated gauze without causing transference of the ointment material to such other material. The film referred to is, however, readily dispersible in water such as the water content of the serum from open wounds or other open lesions and the entire coating material likewise disperses rapidly in such water content to quickly liberate any medicament contained in the ointment base material. The coated gauze of the present invention also does not adhere to the skin or wound surfaces either in its form when applied or after being moistened by an aqueous liquid and again dried.

The coated gauze discussed above is particularly effective as a medium for applying iodine to wounds and will be specifically discussed largely in connection with ointment base material containing readily available iodine although it is to be understood that other medicaments can be employed. Thus, the coated gauze containing iodine in the ointment base material may be packaged in rolls from which any desired length of coated gauze can be severed and held in position by any suitable bandage material or it can be packaged in individual pieces for the same purpose. A preferred manner of supplying the coated gauze is a composite bandage material in which a section of the coated gauze is secured to the mid portion of the adherent side of a length of adhesive tape for holding the gauze in a desired position, the adherent portions of the extending ends of the adhesive tape as well as the exposed surface of the coated gauze being protected by removable strips of uncoated gauze.

It is therefore an object of the invention to provide an improved gauze coated with a non-tacky water-dispersible ointment material which remains soft and flexible until used.

Another object of the invention is to provide a medicated flexible gauze in which the filaments of the gauze are coated or impregnated with a water-dispersible gel containing a medicament, the gel having a substantially dry surface film which renders the surface of the gel non-tacky.

Another object of the invention is to provide a flexible non-tacky coated gauze carrying a water-dispersible gel in which is incorporated a water-soluble or dispersible medicament as a healing aid for wounds or other open lesions.

Another object of the invention is to provide a flexible gauze coated or impregnated with a non-tacky iodine ointment which freely liberates iodine when brought into contact with aqueous fluids.

A further object of the invention is to provide an improved composite bandage in which a medicated gauze element is associated with an adhesive tape element, the gauze element carrying a water-dispersible ointment material which presents a non-tacky surface and carries water-dispersible iodine or other medicament suitable as a healing aid for wounds or other open lesions.

A still further object of the invention is to provide an improved method of making a flexible gauze material coated or impregnated with an ointment material in the form of a water-dispersible gel having a non-tacky surface film.

Other objects and advantages of the invention will appear in the following description of preferred embodiments of the invention illustrated in the attached drawing, of which Figure 1 is a somewhat diagrammatic vertical cross-section of a fragment of a coated gauze in accordance with the present invention;

Figure 2 is a schematic view of apparatus illustrating one method of making the gauze of the present invention; and Figure 3 is a vertical cross-section through a composite bandage containing a coated gauze element.

Referring more particularly to the drawings, Figure 1 is intended to illustrate a gauze made up of woven filaments 10 and 11 coated with the ointment or ointment base discussed below, the ointment coating having an inner portion 12 and a surface film portion 13. In this figure, the size of the textile filaments has been exaggerated for clarity and the same is true of the thickness of the coating. Sharp lines of demarcation have been been shown between the coating and the filaments as well as between the surface film 13 and the inner portion 12 of the ointment coating although there is at least some penetration of the ointment coating into and between the fibers of the filaments 10 and 11 and the surface film 13 of the ointment coating is extremely thin and merges into the inner portion 12 of the ointment coating. Nevertheless, the major portion of the ointment coating is represented by the inner portion 12 and this material remains in the form of a soft gel with an extremely thin substantially dry surface film 13 so that the entire coated gauze remains entirely flexible and soft even though it has a non-tacky surface.

The preferred ointment base material is that disclosed and claimed in my copending application Serial No. 620,408, filed October 4, 1945, now abandoned, and constitutes essentially a soft gel containing a water-dispersible alkylated cellulose, a polyhydroxy alcohol, a mineral oil and an oil-soluble dispersing agent such as a phospholipid. A specific example of a preferred composition of the final ointment base is approximately as follows:

| | Parts by weight |
|---|---|
| Hydroxyethyl cellulose | 150 |
| Triethylene glycol | 900 |
| Mineral oil | 75 |
| Oil-free corn oil phosphatides | 6 |
| Water | 300 |

A preferred manner of making the above ointment base is to first disperse the 150 parts of hydroxyethyl cellulose in 750 parts of water and then add the 900 parts of triethylene glycol. The resulting mixture is heated under vacuum so that the final temperature of the mixture is approximately 100° C., the heating being carried on while the resulting mixture is constantly stirred and until approximately 450 parts of water have been evaporated leaving the 300 parts of water in the final composition. A mineral oil-dispersing agent composition is prepared by adding the six parts of oil-free corn oil phosphatides slowly to the mineral oil while the latter is heated to approximately 100° C. The mineral oil-phosphatide mixture is then added to the hydroxyethyl cellulose, triethylene glycol and water mixture and the two stirred together while at a temperature between approximately 90 and 100° C. Upon cooling, a semi-solid gel having the consistency of a paste or salve suitable for ointment bases is formed.

The mineral oil in the above composition may vary in viscosity from a relatively light oil to a semi-solid material such as petrolatum but an entirely satisfactory gel may be obtained by employing a medicinal mineral oil such as that specified in the U. S. Pharmacopoeia. The preferred dispersing agent is composed of phosphatides obtained from corn oil by known processes as such phosphatides are light in color and extremely stable. As obtained from corn oil, phosphatides ordinarily contain in the neighborhood of 35% corn oil and this is preferably removed by known solvent treatments such as by dissolving out the corn oil with acetone in which the phosphatides are insoluble. Various other phospholipides may, however, be employed, for example, other natural or synthetic phosphatides or derivatives or compounds thereof.

Similarly, other alkylated celluloses may be employed, for example, water-dispersible methyl cellulose. Polyhydroxy alcohols other than triethylene glycol, for example, other liquid glycols as well as glycerine can be substituted in whole or part for the triethylene glycol, the polyoxyethylene glycols being the most suitable. Depending upon the viscosity of the mineral oil employed and the nature of the alkylated cellulose and polyhydroxy alcohol, the proportions of the various ingredients may vary through relatively broad ranges. Thus, the polyhydroxy alcohol will vary between approximately 50 and 90% of the final ointment base, the mineral oil between approximately 3 and 20%, the alkylated cellulose between approximately ½ and 25%, the dispersing agent between approximately 0.0005 and 2%, and the water between approximately 1 and 25%. The best gel structures are obtained when the ointment base is prepared in the manner described in the specific example given above although certain modifications of the order of mixing and the amount of water evaporated from the mixture containing the alkylated cellulose are possible.

The ointment base prepared as described above is inert to and compatible with the vast majority of medicaments employed for treatment of open wounds and other open lesions. As an example of an ointment suitable for coating on gauze, 956 parts of the above ointment base may be admixed with 20 parts of iodine (resublimed crystals) and 24 parts of powdered sodium iodide. The iodine and sodium iodide may be added to the ointment base while at a temperature of approximately 90° C. at which temperature the ointment base is a high viscosity liquid. The heated composition is stirred until the iodine dissolves therein and then is allowed to cool to room temperature. Upon cooling, the gel structure referred to above is formed and the resulting material may be stirred or otherwise agitated without destroying the gel structure.

The resulting ointment containing iodine or other medicament may then be coated upon the gauze in any desired manner, a preferred method of coating being illustrated diagrammatically in Figure 2. In accordance with this figure, a web of gauze 14 may be withdrawn from a suitable roll 16 of gauze by means of a pair of driven rolls 17 and 18 which may be positioned in a drying chamber indicated generally at 19. The web 14 may be drawn by the rolls 17 and 18 over a guide roll 21 and between a pair of coating rolls 22 and 23, the coating rolls 22 and 23 engaging transfer rolls 24 and 26, respectively, the latter rolls rotating in contact with the ointment material held in suitable containers or troughs 27 and 28, respectively. Ointment picked up by the rolls 24 and 26 is transferred to the rolls 22 and 23 and then applied to the web 14 of gauze. If desired, the ointment material in the containers 27 and 28 may be warmed sufficiently to cause it to liquefy. In many cases, a coating on one side of the gauze only is sufficient in which case the roll 26 and associated trough 28 can be omitted.

The coated gauze is then preferably subjected to a surface drying operation, for example, by being festooned in the drying chamber 19. Thus, the rolls 17 and 18 may deliver the web of coated gauze so as to hang the web in festoons 29 on suitable elongated members 31 carried by chains 32 engaging sprockets 33 which may be driven from any suitable source of power by means not shown. The drying chamber 19 may have a casing 34 through which heated drying air may be blown by means of an inlet structure 36 opening into the casing 34 at 37 and an outlet structure 38 opening into the casing 34 at 39. The preferred temperature of the drying air ranges between 100 and 120° C. although temperatures as high as 140° C. may be employed without damaging the product. A small amount of water need be evaporated from the ointment coated upon the gauze since in the absence of agitation a thin substantially impervious film rapidly forms over the surface of the ointment on the gauze and the resulting coated gauze may then be withdrawn from the drying chamber 19, passed through a cooling chamber 40, then over a guide roll 41 and again rolled, for example, upon a roll 42. Rolls 43 and 44 driven at the same speed as the rolls 17 and 18 are also preferably positioned in the drying chamber 19 in order to withdraw the dried gauze from the festoons 29 at the same rate at which it is delivered by the rolls 17 and 18. The dried gauze may be cooled to approximately room temperature in the cooling chamber 40 by circulating dry cooled air therethrough by means of an inlet connection 45 and an outlet connection 45'. The resulting coated gauze may be wound upon the roll 42 without adherence between the various plies of gauze thereon as the surface dried film referred to renders the surface of the gauze non-tacky. The gauze, however, remains extremely flexible and in many cases is even more flexible than the original gauze because of the softening and lubricating qualities of the gel upon the fibers of the gauze.

When the coated gauze is applied to an open lesion, the ointment base carried by the gauze will rapidly disperse in any aqueous material such as the serum from a wound to rapidly liberate any medicament contained in the base. If the medicament is soluble or dispersible in the aqueous material, it is effectively applied to the wound. Iodine in the presence of sodium iodide is soluble in aqueous media and the present invention is particularly adaptable to the application of iodine.

If the coated gauze tends to dry in use after being saturated with an aqueous medium, the surface film again forms on the outer surface of the gauze to prevent further evaporation of water so that the surface of the gauze in contact with a wound or skin remains moist and non-adherent, enabling the bandage to be readily removed without damage to the wound surfaces. Repeated redressing of the wound with the coated gauze of the present invention is therefore non-irritating. It is apparent that gauze coated with the ointment base is an improved bandage material irrespective of whether the ointment base contains a medicament.

For major wounds, the coated gauze may be supplied in rolls so that relatively large areas can be covered. It can be employed alone or other bandage material such as uncoated gauze can be employed to cover the coated gauze. For minor cuts, bruises and the like, a composite bandage such as shown in Figure 3 is advantageously employed. Thus, the composite bandage of Figure 3 may comprise a narrow element of tape 46 having an adhesive layer 47 thereon to which is adhered adjacent its central portion a pad or folded layer of ointment coated gauze 48. The adhesive layer 47 may ordinarily be that used for adhesive tape for medical purposes as the dry surface film of the coated gauze element 48 readily adheres to such an adhesive surface. In order to retain the exposed surface of the coated gauze element 48 in sterile condition, a pair of gauze elements 49 and 51 may be adhesively secured to the ends of the adhesive tape 46 so as to overlap the coated gauze element 48. The gauze elements 49 and 51 may be readily stripped from the adhesive tape 46 to enable application of the composite bandage of Figure 3. The adhesive tape 46 may be perforated as indicated at 52 in the area covered by the coated gauze element 48 to enable escape of aqueous fluids. The composite bandage of Figure 3 including the gauze element 48 coated with an iodine ointment in accordance with the present invention is particularly suitable for the application of iodine to minor wounds and as stated above, the action of the coating employed prevents adherence of the element 48 to the surface of the wound while at the same time providing for rapid application of the iodine and the drainage of fluids from the wound.

While I have disclosed the preferred embodiments of my invention, it is understood that the details thereof may be varied within the scope of the following claims:

I claim:

1. As a product of manufacture, a coated gauze suitable for bandage material, the coating on said gauze being a soft gel adjacent the filaments of said gauze and having a substantially dry, non-tacky exposed surface film, said coating being readily dispersible in aqueous media and comprising a major portion of aliphatic polyhydroxy alcohol and minor portions of water-dispersible alkylated cellulose, water, an oleaginous material and a small amount of a dispersing agent for said oleaginous material, the total polyhydroxy alcohol content of said coating being liquid in the absence of the other ingredients of said coating.

2. As a product of manufacture, a coated gauze suitable for bandage material, the coating on said gauze being a soft gel adjacent the filaments of said gauze and having a substantially dry, non-tacky exposed surface film, said coating being readily dispersible in aqueous media and comprising a major portion of aliphatic polyhydroxy alcohol and minor portions of water-dispersible alkylated cellulose, water, an oleaginous material and a small amount of phospholipid as a dispersing agent for said oleaginous material, the total polyhydroxy alcohol content of said coating being liquid in the absence of the other ingredients of said coating.

3. As a product of manufacture, a coated gauze suitable for bandage material, the coating on said gauze being a soft gel adjacent the filaments of said gauze and having a substantially dry, non-tacky exposed surface film, said coating being readily dispersible in aqueous media and comprising a major portion of aliphatic polyhydroxy alcohol and minor portions of water-dispersible alkylated cellulose, water, a mineral oil and a small amount of phospholipid as a dispersing agent for said mineral oil, the total polyhydroxy alcohol content of said coating being liquid in the absence of the other ingredients of said coating.

4. As a product of manufacture, a coated gauze suitable for bandage material, the coating on said gauze being a soft gel adjacent the filaments of said gauze and having a substantially dry, non-tacky exposed surface film, said coating being readily dispersible in aqueous media and comprising a major portion of aliphatic polyhydroxy alcohol and minor portions of water-dispersible alkylated cellulose, water, a mineral oil and a small amount of corn oil phosphatide as a dispersing agent for said mineral oil, the total polyhydroxy alcohol content of said coating being liquid in the absence of the other ingredients of said coating.

5. As a product of manufacture, a coated gauze suitable for bandage material, the coating on said gauze containing a medicament and being a soft gel adjacent the filaments of said gauze and having a substantially dry, non-tacky exposed surface film, said coating being readily dispersible in aqueous media and comprising a major portion of aliphatic polyhydroxy alcohol and minor portions of water-dispersible alkylated cellulose, water, a mineral oil and a small amount of corn oil phosphatide as a dispersing agent for said mineral oil, the total polyhydroxy alcohol content of said coating being liquid in the absence of the other ingredients of said coating.

6. As a product of manufacture, a coated gauze suitable for bandage material, the coating on said gauze containing a small amount of iodine and sodium iodide in solution therein and being a soft gel adjacent the filaments of said gauze and having a substantially dry, non-tacky exposed surface film, said coating being readily dispersible in aqueous media and comprising a major portion of aliphatic polyhydroxy alcohol and minor portions of water-dispersible alkylated cellulose, water, mineral oil and a small amount of corn oil phosphatide as a dispersing agent for said mineral oil, the total polyhydroxy alcohol content of said coating being liquid in the absence of the other ingredients of said coating.

7. As a product of manufacture, a flexible coated gauze suitable for bandage material, the coating on said gauze containing a medicament and being a soft gel adjacent the filaments of said gauze and having a substantially dry, non-tacky exposed surface film, said coating being readily dispersible in aqueous media and comprising approximately 0.5% to 25% water dispersible alkylated cellulose, approximately 50% to 90% aliphatic polyhydroxy alcohol, approximately 3% to 20% mineral oil, approximately 0.0005% to 2% phospholipid as a dispersing agent for said mineral oil and approximately 1% to 25% water, the total polyhydroxy alcohol content of said coating being liquid in the absence of the other ingredients of said coating.

8. As a product of manufacture, a flexible coated gauze suitable for bandage material, the coating on said gauze containing a small amount of iodine and sodium iodide in solution therein and being a soft gel adjacent the filaments of said gauze and having a substantially dry, non-tacky exposed surface film, said coating being readily dispersible in aqueous media and comprising approximately 0.5% to 25% water-dispersible alkylated cellulose, approximately 50% to 90% aliphatic polyhydroxy alcohol, approximately 3% to 20% mineral oil, approximately 0.0005% to 2% phospholipid as a dispersing agent for said mineral oil and approximately 1% to 25% water, the total polyhydroxy alcohol content of said coating being liquid in the absence of the other ingredients of said coating.

9. The method of making a flexible, non-tacky, ointment coated bandage material, which comprises, impregnating a web of gauze with a water-dispersible, semi-solid ointment material in the form of a soft gel, said ointment material containing a major portion of aliphatic polyhydroxy alcohol and minor portions of water-dispersible alkylated cellulose, water, an oleaginous material and a small amount of a dispersing agent for said oleaginous material, the total polyhydroxy alcohol content of said ointment material being liquid in the absence of the other ingredients of said ointment material, and thereafter surface drying the coated gauze until a substantially dry, non-tacky film forms on the exposed surface of said gel leaving a layer of said soft gel adjacent the filaments of said gauze.

10. The method of making a flexible, non-tacky, ointment coated bandage material, which comprises, impregnating a web of gauze with a water-dispersible, semi-solid ointment material containing a medicament, in the form of a soft gel, said ointment material also containing a major portion of aliphatic polyhydroxy alcohol and minor portions of water-dispersible alkylated cellulose, water and mineral oil and a small amount of phospholipid as a dispersing agent for said mineral oil, the total polyhydroxy alcohol content of said coating being liquid in the absence of the other ingredients of said coating and thereafter surface drying the coated gauze until a non-tacky film forms on the exposed surface of said gel leaving a layer of said soft gel adjacent the filaments of said gauze.

11. The method of making a flexible, non-tacky, ointment coated bandage material, which comprises, impregnating a web of gauze with a water-dispersible, semi-solid ointment material in the form of a soft gel containing a small amount of iodine and sodium iodide in solution therein, said ointment material also containing a major portion of aliphatic polyhydroxy alcohol and minor portions of water-dispersible alkylated cellulose, water and mineral oil and a small amount of phospholipid as a dispersing agent for said mineral oil, the total polyhydroxy alcohol content of said coating being liquid in the absence of the other ingredients of said coating, and thereafter surface drying the coated gauze until a non-tacky film forms on the exposed surface of said gel leaving a layer of said soft gel adjacent the filaments of said gauze.

12. The method of making a flexible, non-tacky, ointment coated bandage material, which comprises, impregnating a web of gauze with a water-dispersible, semi-solid ointment material in the form of a soft gel containing a medicament, said ointment material also containing approximately 0.5% to 25% water-dispersible alkylated cellulose, approximately 50% to 90% aliphatic polyhydroxy alcohol, approximately 3% to 20% mineral oil, approximately 0.0005% to 2% phospholipid as a dispersing agent for said mineral oil and approximately 1% to 25% water, the total polyhydroxy alcohol content of said ointment material being liquid in the absence of the other ingredients of said ointment material, and thereafter surface drying the coated gauze until a non-tacky film forms on the exposed surface of said gel leaving a layer of said soft gel adjacent the filaments of said gauze.

ABRAHAM TAUB.

REFERENCES CITED

The following references are of record in the file of this patent:

UNITED STATES PATENTS

| Number | Name | Date |
|---|---|---|
| 974,294 | Pond | Nov. 1, 1910 |
| 974,295 | Pond | Nov. 1, 1910 |
| 1,044,817 | Pond | Nov. 19, 1912 |
| 1,304,600 | Pond | May 27, 1919 |
| 2,145,755 | Dickson | Jan. 31, 1939 |
| 2,226,546 | Bower | Dec. 31, 1940 |
| 2,390,391 | Ritter | Dec. 4, 1945 |
| 2,408,818 | Sabotka | Oct. 8, 1946 |

(Filed Dec. 18, 1941)

OTHER REFERENCES

Committee on Medical Research, O. S. R. S.; Contract No. OEMcmr—334—Bimonthly progress report #8, Oct. 1, 1944.

Dedication

2,464,755.—*Abraham Taub*, New York, N.Y. COATED GAUZE. Patent dated Mar. 15, 1949. Dedication filed June 30, 1964, by the assignee, *Benjamin Clayton*.

Hereby dedicates to the public the terminal part of the term of said patent effective December 31, 1963.

[*Official Gazette September 29, 1964.*]